United States Patent
Yagi et al.

(10) Patent No.: US 8,126,059 B2
(45) Date of Patent: Feb. 28, 2012

(54) MOTION VECTOR DETECTION DEVICE AND MOTION VECTOR DETECTION METHOD

(75) Inventors: Tatsuaki Yagi, Aichi (JP); Hiroki Kawatomi, Aichi (JP)

(73) Assignee: Sony Corporation, Tokyo (JP)

( * ) Notice: Subject to any disclaimer, the term of this patent is extended or adjusted under 35 U.S.C. 154(b) by 882 days.

(21) Appl. No.: 12/181,355

(22) Filed: Jul. 29, 2008

(65) Prior Publication Data

US 2009/0033800 A1  Feb. 5, 2009

(30) Foreign Application Priority Data

Jul. 31, 2007 (JP) ................ P2007-199723

(51) Int. Cl.
*H04N 11/02* (2006.01)
(52) U.S. Cl. .................. 375/240.16; 348/699
(58) Field of Classification Search ............ 375/240.01, 375/240.16; 348/699
See application file for complete search history.

(56) References Cited

U.S. PATENT DOCUMENTS

| 4,628,362 A | 12/1986 | Waehner |
| 4,984,074 A * | 1/1991 | Uomori et al. ............... 348/699 |
| 5,706,054 A * | 1/1998 | Hannah ................... 375/240.12 |
| 5,758,091 A | 5/1998 | Hannah |

FOREIGN PATENT DOCUMENTS

| EP | 0 557 095 | 8/1993 |
| EP | 0 656 725 | 6/1995 |
| EP | 1 703 739 | 9/2006 |
| JP | 5 292489 | 11/1993 |
| JP | 11 205816 | 7/1999 |
| JP | 2001 309384 | 11/2001 |
| JP | 2005 354370 | 12/2005 |

* cited by examiner

*Primary Examiner* — Frank Duong
(74) *Attorney, Agent, or Firm* — Frommer Lawrence & Haug LLP; William S. Frommer

(57) ABSTRACT

A motion vector detection device includes: a separation section that separates a video signal into a brightness component and a color-difference component; a selection section that selects either the brightness component or the color-difference component, or both; a gain controlling section that controls, if the selected brightness or/and color-difference components exceed a predetermined reference level, its/their gains; and a motion vector detection section that detects a motion vector based on the result of gain control by the gain controlling section.

8 Claims, 3 Drawing Sheets

MOTION VECTOR DETECTION DEVICE AND MOTION VECTOR DETECTION METHOD

CROSS REFERENCES TO RELATED APPLICATIONS

The present invention contains subject matter related to Japanese Patent Application JP2007-199723 filed in the Japanese Patent Office on Jul. 31, 2007, the entire contents of which being incorporated herein by reference.

BACKGROUND OF THE INVENTION

1. Field of the Invention

The present invention relates to a motion vector detection device and motion vector detection method, and is preferably applied to a television receiver and the like which are designed to display motion pictures, for example.

2. Description of the Related Art

As disclosed in Jpn. Pat. Laid-open Publication No. 2007-104652, there is a television receiver employing Interlace-Progressive (IP) conversion processing function in order to improve the quality of images displayed on a display unit: the function is used to convert interlace-format video signals, or interlaced video signals, into progressive-format video signals, or progressive video signals.

SUMMARY OF THE INVENTION

By the way, the above television receiver includes a motion adoptive IP converter to realize the IP conversion processing function. It detects motion vectors from a plurality of field images from the interlaced video signals, and if it determines from the detected motion vectors that there is no motion as for a certain pixel, it performs interpolation by using pixels of the previous and subsequent field images (or those that appear before and after the target field image) of the interlaced video signals. Whereas if it determines that there is motion, it performs interpolation by using nearby pixels of the interlaced video signals' filed images corresponding to the progressive video signals' frame images.

If there are outstanding levels of signals (or pixels) in the field images, the television receiver might detect motion vectors that are inappropriate for the subsequent image processing.

The present invention has been made in view of the above points and is intended to provide a motion vector detection device and motion vector detection method that avoids detecting inappropriate motion vectors to ensure stable image processing with the high quality of images.

In one aspect of the present invention, a motion vector detection device includes: a separation section that separates a video signal into a brightness component and a color-difference component; a selection section that selects either the brightness component or the color-difference component, or both; a gain controlling section that controls, if the selected brightness or/and color-difference components exceed a predetermined reference level, its/their gains; and a motion vector detection section that detects a motion vector based on the result of gain control by the gain controlling section. Accordingly, even if there are outstanding, irregular brightness or/and color-difference components, its/their gains are controlled. This allows the device to avoid detecting inappropriate motion vectors before performing image processing.

According to an embodiment of the present invention, even if there are outstanding, irregular brightness or/and color-difference components, its/their gains are controlled. This allows the device to avoid detecting inappropriate motion vectors before performing image processing. Thus, a motion vector detection device and motion vector detection method can avoid detecting inappropriate motion vectors and ensure stable image processing with the high quality of images.

The nature, principle and utility of the invention will become more apparent from the following detailed description when read in conjunction with the accompanying drawings in which like parts are designated by like reference numerals or characters.

DETAILED DESCRIPTION OF PREFERRED EMBODIMENTS

An embodiment of the present invention will be described in detail with reference to the accompanying drawings.

(1) Configuration of Video Display Device

Figure 1:
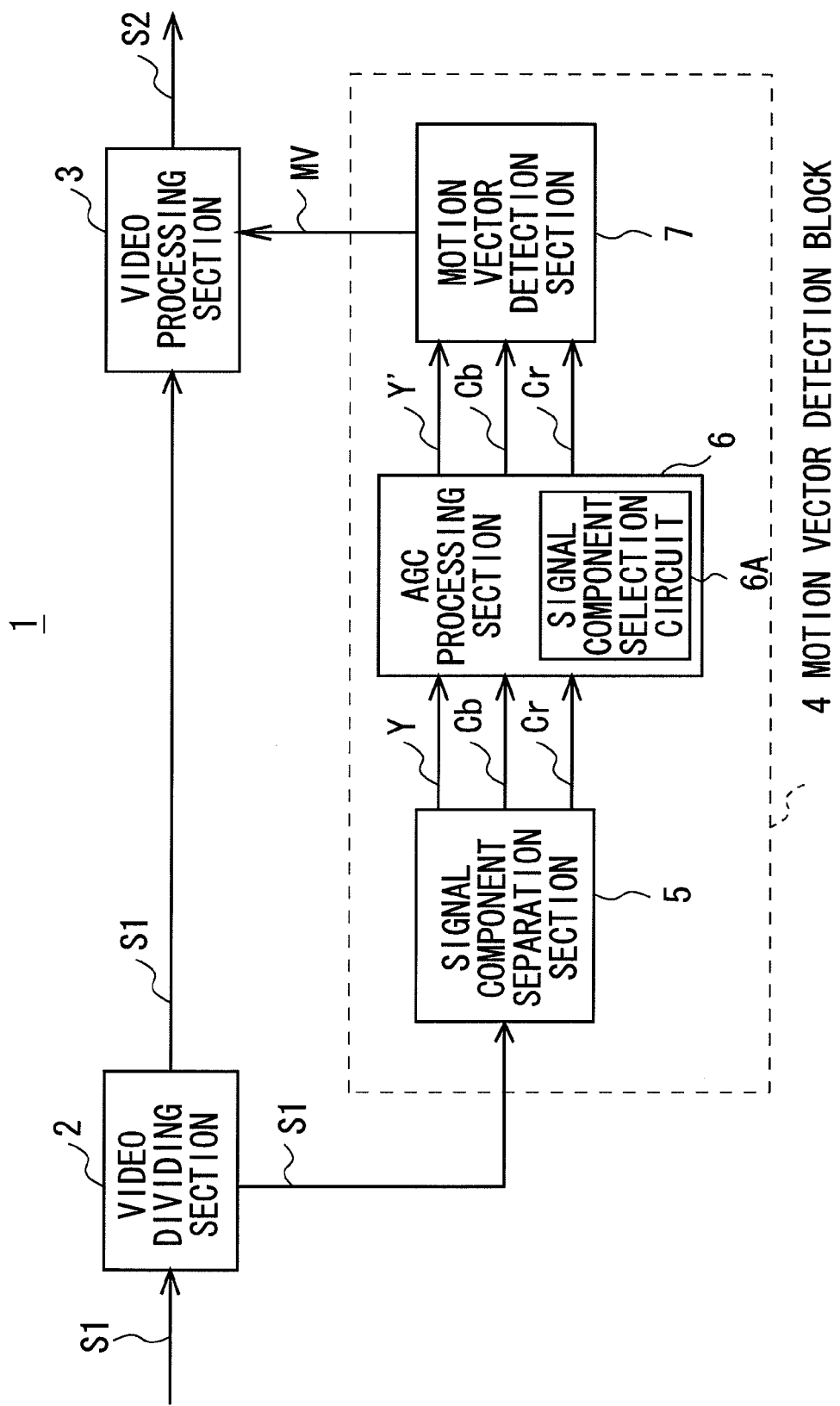
FIG. 1 is a schematic block diagram illustrating the circuit configuration of a video display device.

In FIG. 1, the reference numeral 1 denotes a video display device as a whole. The video display device 1 includes a video dividing section 2, a video processing section 3 and a motion vector detection block 4. One frame of video signal S1 is input as a source into the video dividing section 2.

The video dividing section 2 divides the video signal S1 into two, one of which is supplied to the video processing section 3 and the other of which is supplied to a signal component separation section 5 of the motion vector detection block 4.

The signal component separation section 5 of the motion vector detection block 4 separates the video signal S1 into predetermined macro block units, or four blocks of brightness components Y, two blocks of color-difference components Cb and Cr. The signal component separation section 5 subsequently supplies them to an Automatic Gain Control (AGC) processing section 6.

The AGC processing section 6 includes a signal component selection circuit 6A. The signal component selection circuit 6A selects one of those components supplied from the signal component separation section 5: the brightness component Y, or the color-difference component Cb or Cr. As its initial setting, the AGC processing section 6 selects the brightness component Y.

If the gain of the brightness component Y selected by the signal component selection circuit 6A exceeds a predetermined reference level, the AGC processing section 6 controls its gain, and then supplies the gain-controlled brightness component Y' to a motion vector detection section 7, along with the color-difference components Cb and Cr.

The motion vector detection section 7 detects motion vectors MV of the video signal S1 from the brightness component Y' and color-difference components Cb and Cr supplied from the AGC processing section 6, and supplies the motion vectors MV to the video processing section 3.

After receiving the video signal S1 from the video dividing section 2, the video processing section 3 holds the video signal S1 and waits until it receives the motion vectors MV from the motion vector detection section 7 of the motion vector detection block 4.

After receiving the motion vectors MV, the video processing section 3 performs a motion compensation process to the video signal S1 using the motion vectors MV, and then outputs a resulting video signal S2 to a display section such as Liquid Crystal Display (LDC).

Figure 2:
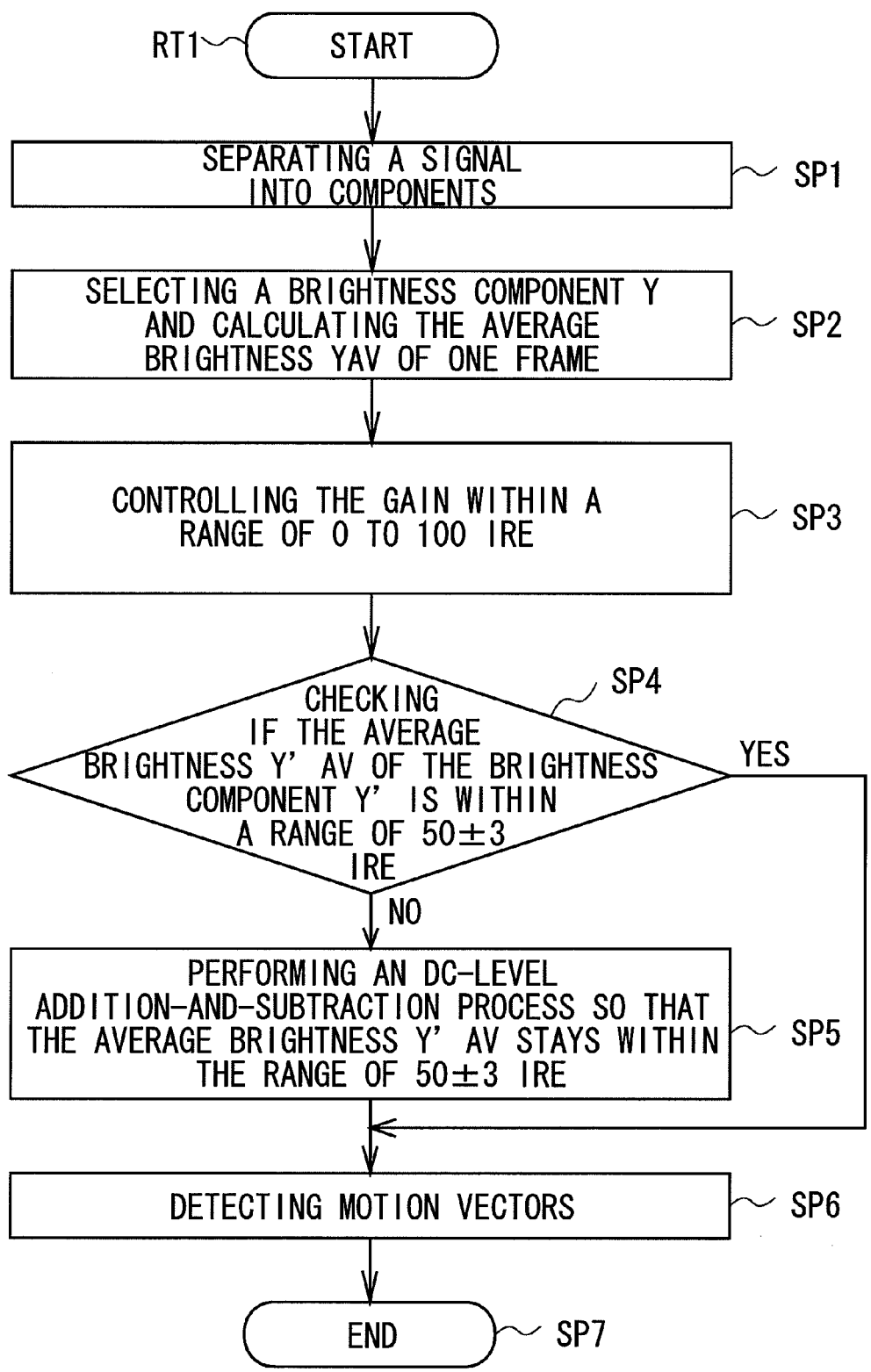
FIG. 2 is a flowchart illustrating a procedure of motion vector detection process according to an embodiment of the present invention.

The following describes the process of the motion vector detection section 4 of the video display device 1 in detail with reference to FIG. 2.

(2) Motion Vector Detection Process

As shown in FIG. 2, the video display device 1 starts a routine RT1 from start step and then proceeds to step SP1. At step SP1, the signal component separation section 5 of the motion vector detection block 4 separates one frame of video signal S1, supplied from the video signal dividing section 2, into the brightness components Y and the color-difference components Cb and Cr. The video display device 1 subsequently proceeds to step SP2.

At step SP2, from among those the brightness components Y and color-difference components Cb and Cr, the signal component selection section 6A selects the brightness component Y for the AGC processing section 6 to control its gain, and calculates its one-frame average brightness level YAV. Subsequently, the video display device 1 proceeds to step SP3.

Figure 3A:
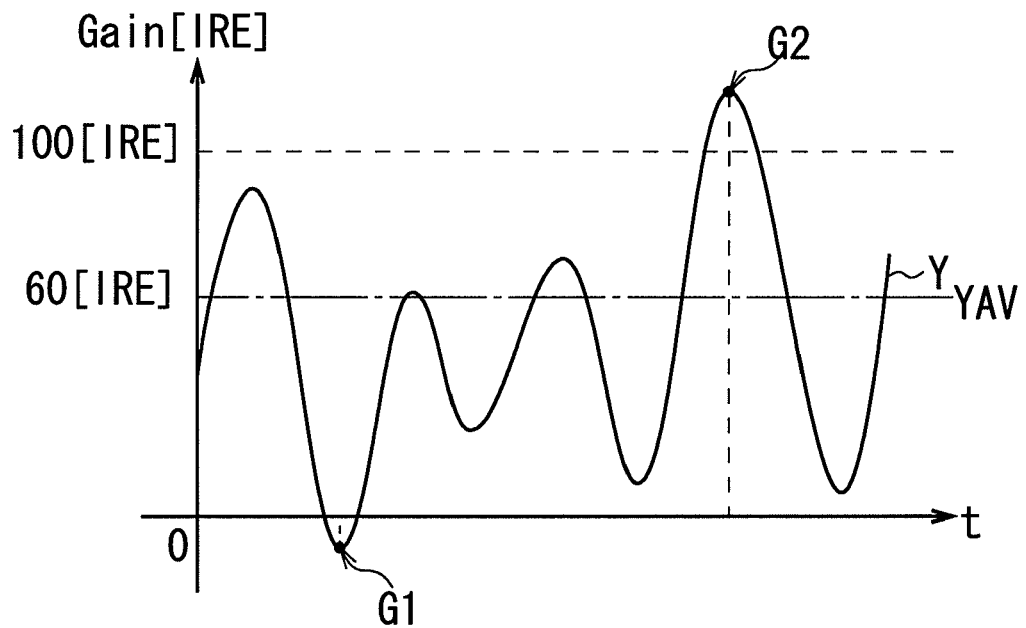
FIG. 3 is a schematic diagram illustrating waveforms of brightness components before and after AGC processing.

For example, as shown in FIG. 3A, there is a possibility that the average brightness level YAV, the average of the brightness level Y, could be 60 IRE, or that the brightness component Y may include pixels G1 and G2 with outstanding brightness levels due to noise or the like.

If the motion vectors MV are detected from the brightness component Y containing those pixels G1 and G2, they may inappropriately affect the video display process of the video processing section 3 of the video display device 1.

Accordingly, the AGC processing section 6 of the video display device 1, at step SP3, controls the gain of the brightness component Y as a whole, such that they stay within a range of 0 to 100 IRE, if the brightness component Y includes pixels whose brightness levels are less than 0 IRE or greater than 100 IRE, such as pixels G1 and G2. The video display device 1 subsequently proceeds to step SP4. Incidentally, IRE is a unit named after an academic society, representing the amplitude of video signals.

At step SP4, the video display device 1 makes a determination as to whether the average brightness Y'AV, or the average of the gain-controlled brightness component Y', is within a range of 50±3 IRE. If the negative result is obtained, the device 1 proceeds to step SP5, and if not, it proceeds to step SP6.

At step SP5, the AGC processing section 6 performs an addition-and-subtraction process of Direct Current (DC) level so that the average brightness Y'AV stays within the range of 50±3 IRE. The video display device 1 subsequently proceeds to step SP6.

Figure 3B:
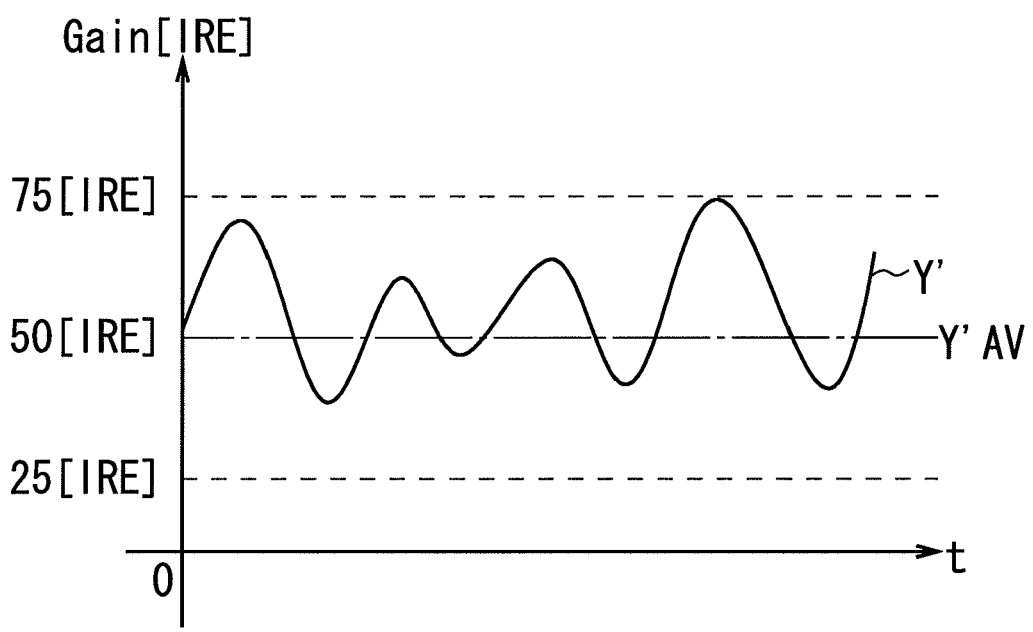

As a result, as shown in FIG. 3B, the gain-controlled brightness component Y' is maintained by the video display device 1 within a range of 25 to 75 IRE, and its average brightness Y'AV within the range of 50±3 IRE.

At step SP6, the video display device 1 detects the video signal S1's motion vectors MV from the gain-controlled brightness component Y', supplies the motion vectors MV to the video processing section 3, and then proceeds to step SP7 to end the process.

(3) Operation and Effect

As described above, the video display device 1 divides the video signal Si into the brightness component Y and the color-difference components Cb and Cr, and controls the gain of the brightness component Y by the AGC processing section 6. This allows the video display device 1 to get rid of the negative effects of outstanding pixels, such as the pixels G1 and G2 caused by noise or the like, before the video processing section 3 starts image processing based on the motion vectors. Therefore, the image processing by the video processing section 3 becomes stabilized.

Moreover, the video dividing section 2 divides the video signal S1 into two, and the motion vector detection block 4 uses a different video signal V1 from the one, or another video signal V1, supplied to the video processing section 3.

Accordingly, the detection process of the motion vectors MV by the motion vector detection block 4 does not affect the image processing of the video signal Si by the video processing section 3. Therefore, the image processing by the video processing section 3 becomes stabilized.

According to the above configuration, the video display device 1, by using the AGC processing section 6, controls the gain of the brightness component Y of the video signal S1 such that it stays within the predetermined ranges. This allows the video display device 1 to get rid of the negative effects of outstanding pixels, such as the pixels G1 and G2 caused by noise or the like, before detecting the motion vectors MV. Therefore, the high-quality, stable images can be obtained based on the detected motion vectors MV.

(4) Other Embodiments

In the above-noted embodiment, the device controls the gain of the brightness component Y of the video signal S1, and detects the motion vectors MV from the gain-controlled brightness components Y'. However, the present invention is not limited to this. Instead, the device may control the gain of the color-difference component Cb or Cr, and then detect the motion vectors MV from the gain-controlled color-difference component Cb' or Cr'.

Moreover, in the above-noted embodiment, the device controls the gain of the brightness component Y of the video signal S1, and detects the motion vectors MV from the gain-controlled brightness components Y'. However, the present invention is not limited to this. Instead, the device may control the gains of both the brightness component Y and the color-difference components Cb and Cr, and then detect the motion vectors MV from the gain-controlled brightness component Y' and the color-difference components Cb' and Cr'.

Furthermore, in the above-noted embodiment, the video signal S1 is divided into the brightness component Y and the color-difference components Cb and Cr. However, the present invention is not limited to this. Instead, the video signal S1 may be divided into the brightness component Y and the color-difference component C.

Furthermore, in the above-noted embodiment, the video signal S1 is divided into the brightness component Y and the color-difference components Cb and Cr, and the gain of the brightness component Y is controlled, and the motion vectors MV are detected from the gain-controlled brightness component Y'. However, the present invention is not limited to this. Instead, the video signal S1 may be divided into a red component, a green component, and a blue component, and one, two, or all of which may be controlled in gain, and the motion vectors MV may be detected from the gain-controlled component(s).

Furthermore, in the above-noted embodiment, the motion vector detection block 4, which is the equivalent of a motion vector detection device of an embodiment of the present invention, includes the signal component separation section 5 as separation means; the signal component selection circuit 6A as selection means; the AGC processing section 6 as gain controlling means; and the motion vector detection section 7 as motion vector detection means. However, the present invention is not limited to this. The motion vector detection device may have different configuration, so that the separation means, the selection means, the gain controlling means, and the motion vector detection means can be realized.

The above motion vector detection device and motion vector detection method can be applied to a television receiver that displays motion pictures, as well as other electronics devices for displaying motion pictures, such as personal computers, Personal Digital Assistant, cell phones, and portable music players.

It should be understood by those skilled in the art that various modifications, combinations, sub-combinations and alterations may occur depending on design requirements and other factors insofar as they are within the scope of the appended claims or the equivalents thereof.

What is claimed is:

1. A motion vector detection device comprising:
    separation means for separating a video signal into a brightness component and a color-difference component;
    selection means for selecting either the brightness component or the color-difference component, or both;
    gain controlling means for controlling, if the selected brightness or/and color-difference components exceed a predetermined reference level, its/their gains; and
    motion vector detection means for detecting a motion vector based on the result of gain control by the gain controlling means.

2. The motion vector detection device according to claim 1, wherein
    the gain controlling means controls only the gain of the brightness component.

3. The motion vector detection device according to claim 1, wherein
    the gain controlling means controls only the gain of the color-difference component.

4. The motion vector detection device according to claim 1, wherein
    the gain controlling means controls both the gain of the brightness component and the gain of the color-difference component.

5. The motion vector detection device according to claim 1, further comprising
    dividing means for dividing the video signal into two video signal, one of which is separated into the brightness and color-difference components and the other of which is used to display a video image on a predetermined display means.

6. A motion vector detection device comprising:
    separation means for separating a video signal into into a red component, a green component and a blue component;
    selection means for selecting one or all of the red, green, and blue components;
    gain controlling means for controlling, if the selected red, green or/and blue components exceed a predetermined reference level, its/their gains; and
    motion vector detection means for detecting a motion vector based on the result of gain control by the gain controlling means.

7. A motion vector detection method comprising:
    a separation step of separating a video signal into a brightness component and a color-difference component by signal component separation means;
    a selection step of selecting either the brightness component or the color-difference component, or both, by selection means;
    a gain controlling step of controlling, if the selected brightness or/and color-difference components exceed a predetermined reference level, its/their gains, by gain controlling means; and
    a motion vector detection step of detecting, by motion vector detection means, a motion vector based on the result of gain control by the gain controlling step.

8. A motion vector detection device comprising:
    a separation section that separates a video signal into a brightness component and a color-difference component;
    a selection section that selects either the brightness component or the color-difference component, or both;
    a gain controlling section that controls, if the selected brightness or/and color-difference components exceed a predetermined reference level, its/their gains; and
    a motion vector detection section that detects a motion vector based on the result of gain control by the gain controlling section.

* * * * *